United States Patent [19]

Ueda

[11] 4,063,526

[45] Dec. 20, 1977

[54] COMPOSITE PNEUMATIC MARINE FENDER

[75] Inventor: Shigeo Ueda, Yokohama, Japan

[73] Assignee: Bridgestone Tire Company Limited, Tokyo, Japan

[21] Appl. No.: 712,295

[22] Filed: Aug. 6, 1976

[30] Foreign Application Priority Data

Aug. 27, 1975 Japan .................................... 103044

[51] Int. Cl.$^2$ .......................................... B63B 59/02
[52] U.S. Cl. ................................................ 114/220
[58] Field of Search .............................. 114/219–220; 267/116, 139, 140; 293/71 R, 71 P; 61/48

[56] References Cited

U.S. PATENT DOCUMENTS

| 3,181,849 | 5/1965 | Mitchell | 267/140 |
| 3,804,395 | 4/1974 | Muller | 267/140 |

Primary Examiner—Trygve M. Blix
Assistant Examiner—Jesus D. Sotelo
Attorney, Agent, or Firm—Sughrue, Rothwell, Mion, Zinn and Macpeak

[57] ABSTRACT

A composite pneumatic marine fender comprising a plurality of independent and separate hollow chambers to be pressurized is disclosed. The hollow chambers are formed by bonding together outer and inner cylinders, each composed of a thin rubber like elastic cylindrical body and including an inextensible reinforcing member embedded therein at a plurality of regions separated from each other and extended in a direction parallel to the axial line of the outer cylinder and terminate at both ends of the outer and inner cylinders.

4 Claims, 4 Drawing Figures

COMPOSITE PNEUMATIC MARINE FENDER

This invention relates to a composite pneumatic marine fender.

In general, a pneumatic marine fender comprises a barrel-shaped bag including an inextensible reinforcing member such as a tire cord or steel cord, etc. embedded therein. Such barrel-shaped bag when pressurized into an expanded state serves to absorb berthing impact energy in mooring of a ship produced when the pressurized bag is subjected to the berthing load in a direction parallel to its diameter perpendicular to the axis thereof. The pressure of compressed air admitted into the bag becomes considerably increased at the end of compression thereof, so that the pressure of compressed air to be admitted into the bag at the beginning is required to be low. In addition, at the beginning in mooring of a ship, the contact area between the ship and the marine fender is small, and as a result, the berthing reaction force at the beginning in mooring of the ship is extremely small as shown by a curve A in FIG. 1. If the marine fender is further deformed, the pressure of compressed air admitted thereinto becomes higher. At the same time, the berthing area of the marine fender becomes increased. The berthing reaction force which corresponds to the product resulting from the multiplication together of both the increased internal pressure and the increased berthing area becomes rapidly risen up as also shown by the curve A in FIG. 1.

The berthing impact absorption energy represented by an area between the curve A and the abscissa, therefore, is so small that the berthing load acting on the ship in mooring becomes considerably large.

In addition, this causes the internal pressure to rapidly rise up, thereby breaking up the pneumatic marine fender. The breakage of the pneumatic marine fender deprives it of its faculty as the marine fender.

An object of the invention is to provide a composite pneumatic marine fender which can effectively obviate the above mentioned disadvantages of the prior art pneumatic marine fender and which can easily change its fender faculty in dependence with the berthing impact absorption energy of various kinds of ships by a simple operation, can easily be fitted to a quay or dock wall and which requires little maintenance.

A feature of the invention is the provision of a composite pneumatic marine fender comprising an outer cylinder composed of a thin rubber like elastic cylindrical body including an inextensible reinforcing member embedded therein, an inner cylinder composed of a thin rubber like elastic cylindrical body and surrounded by said outer cylinder, said inner cylinder being bonded together with said outer cylinder at a plurality of regions each aligned with a generatrix whose motion generates the surface of said outer cylinder and at a region formed at each of said outer and inner cylinders to form a plurality of hollow chambers to be pressurized, and a core cylinder composed of a thick rubber like elastic body and surrounded by said plurality of hollow chambers, said core cylinder being embraced by said inner cylinder when compressed air is admitted into said plurality of hollow chambers and said inner cylinder is inwardly expanded.

The invention will now be described in greater detail with reference to the accompanying drawings, wherein.

Figure 3:
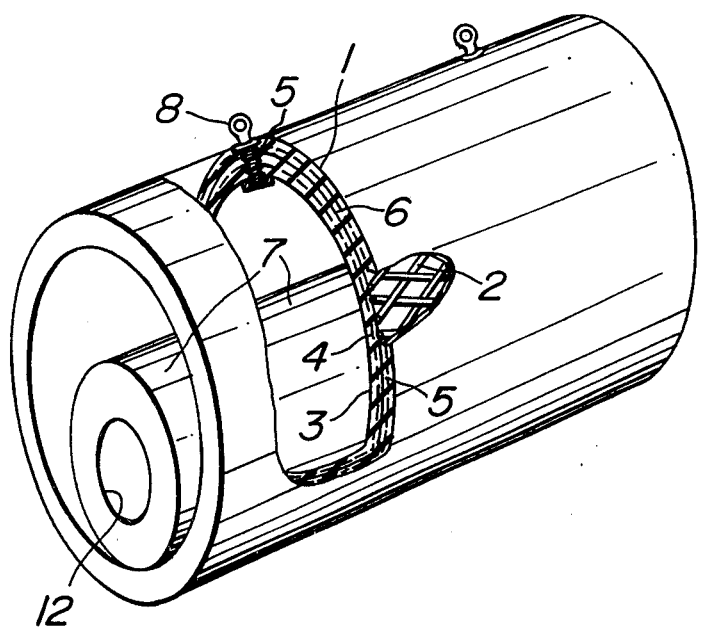
FIG. 3 is a perspective view similar to FIG. 2 but showing a state prior to take the inner core out of the outer and inner cylinders.

Referring to the embodiment shown in the drawings, reference numeral 1 designates an outer cylinder composed of a thin rubber like elastic cylindrical body formed of rubber, etc., and 2 shows an inextensible reinforcing member embedded in the outer cylinder 1 and composed of a tire cord or steel cord. These inextensible reinforcing members 2 may be bias-laid with respect to the axial line of the outer cylinder 1 as shown in FIG. 3 so as to easily deform the outer cylinder 1 in mooring.

Reference numeral 3 designates an inner cylinder or member composed of a thin rubber like elastic cylindrical body. In the present embodiment, the inner cylinder 3 has such an outer diameter that the inner cylinder 3 makes contact internally with the outer cylinder 1. In the inner cylinder 3 may be embedded an inextensible reinforcing member 4, which eventually may be omitted when the marine fender is of a small size.

Both the outer and inner cylinders 1, 3 are bonded together at a region 5. In the present embodiment, the outer and inner cylinders are bonded together at three regions 5. These bonded regions 5 are separated from each other and extended in a direction parallel to the axial line of the outer cylinder 1 and terminate at both ends of the outer and inner cylinders 1, 3. The bonded regions 5 at both ends of the outer and inner cylinders 1, 3 are made integral with each other to define a hollow chamber 6 into which is admitted compressed air. In the present embodiment, three hollow chambers 6 are defined between the outer and inner cylinders 1, 3 by the three bonded regions 5.

Inside the hollow chambers 6 is arranged a core cylinder or member 7 composed of a thick rubber like elastic cylindrical body. The core cylinder 7 is embraced by the inner cylinder 3 when compressed air is admitted thereinto and the inner cylinder 3 in inwardly expanded. In order to prevent the core cylinder 7 from being slipped out of the inner cylinder 3, the core cylinder 7 may be provided at each end thereof projected out of each end thereof with a flange (not shown) abutted against each end of the inner cylinder 3. In addition, it is preferable to provide an annular wire or a ring embedded in the flange.

The above mentioned composite pneumatic fender according to the invention is fitted to a quay or dock wall with the aid of a metal fitting 8 extended through and secured to the bonded region 5 of the outer and inner cylinders 1, 3 and threadedly engaged with a nut 10 and a chain or wire rope 9 connected at one end to the metal fitting 8 and at another end to an anchor bolt 11 fitted to the quay or dock wall.

The chain 9 or a wire rope may directly be fitted to core cylinder or member 7, to the extent of an inner hole 12 provided at the center of the core cylinder 7. Thus, it is possible to hang down the composite pneumatic fender from the quay or dock wall.

Figure 1:
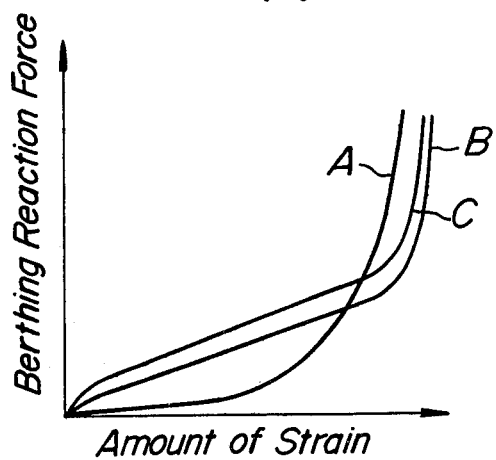
FIG. 1 is a graph showing a plot berthing reaction force as a function of amount of strain produced in a conventional barrel-shaped pneumatic marine fender and a composite pneumatic marine fender according to the invention, the berthing impact absorption energy being represented by an area between respective curves and the abscissa.
Figure 2:
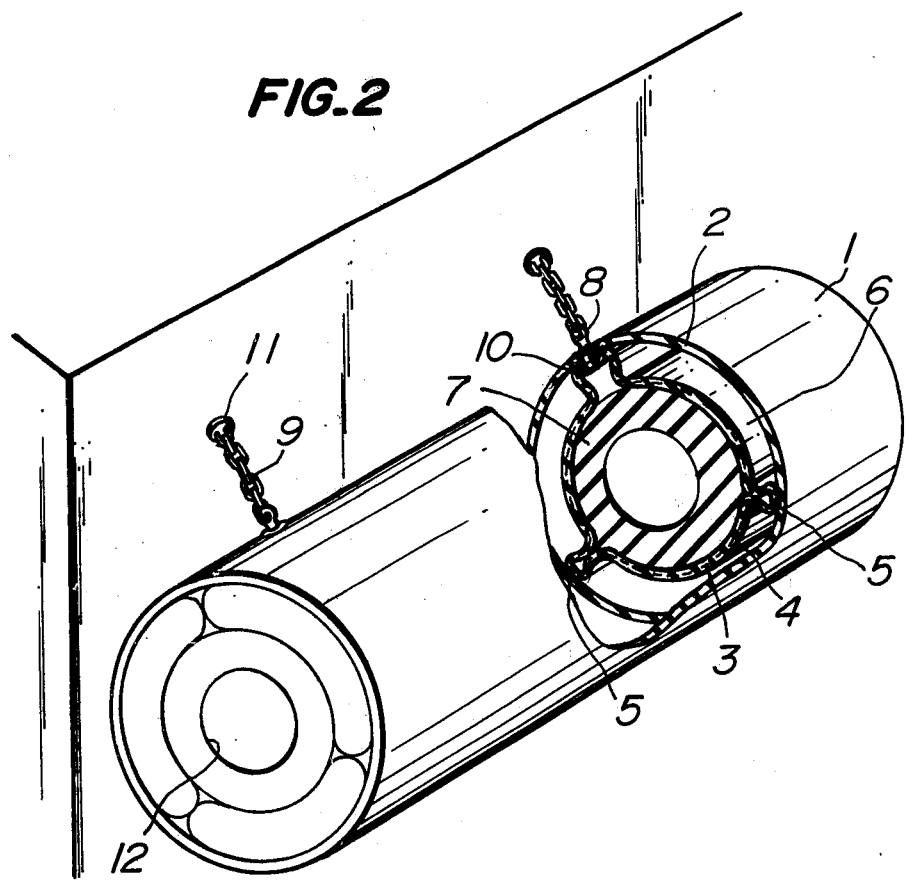
FIG. 2 is a perspective view of one embodiment of the composite pneumatic marine fender according to the invention which has been fitted to a quay, a part being broken away to show essential parts thereof.

When the core cylinder 7 per se embraced by the inner cylinder 3 inwardly expanded by pressurizing the hollow chambers 6 is subjected to the load of a ship on being moored, the berthing reaction force becomes rapidly increased at the beginning of compression and then rises up in a straight line as shown by a curve B in FIG. 1.

As a result, the effect of absorbing the berthing impact energy of the composite pneumatic marine fender according to the invention comprising the thick core cylinder 7 embraced by the plurality of pressurized hollow chambers 6 is far superior to that of the conventional pneumatic marine fender comprising one pressurized hollow chamber only. That is, as can be seen from comparison between the curve B showing the berthing reaction force of the composite pneumatic marine fender according to the invention and the curve A showing the berthing reaction force of the conventional pneumatic marine fender, the composite pneumatic marine fender according to the invention can completely absorb the kinetic energy of the ship in mooring prior to the rapid rise up of the berthing reaction force as shown by the curve B in FIG. 1, thereby preventing breakage, etc. of the pneumatic marine fender.

If the thickness of the core cylinder 7 is made larger, it is possible to further increase the berthing impact absorption energy as shown by a curve C in FIG. 1.

In the present invention, if the hollow chamber 6 is evacuated, the inner core cylinder 7 is released from the hollow chamber 6 as shown in FIG. 3. So, it is possible to take the inner core cylinder 7 out of the outer and inner cylinders 1, 3 and hence collapse the outer and inner cylinders 1, 3 into a small size. As a result, the composite marine fender according to the invention can easily be transported and effectively absorb the dynamic energy of the ship on being moored in a port.

The composite pneumatic marine fender according to the invention provides another important advantage that since a plurality of pressurized hollow chambers, whose number is three in the present embodiment, are independent and separated from each other, even when one of these hollow chambers becomes broken, the remaining pressurized hollow cylinders can maintain the faculty of the pneumatic marine fender.

As can be seen from the above, the composite pneumatic marine fender according to the invention is convenient in transportation and maintenance in a limited space such as ships, etc., so that it can conveniently be used as a marine fender which is carried by ships.

What is claimed is:

1. A composite pneumatic marine fender comprising an outer cylinder composed of a thin rubber like elastic cylindrical body including an inextensible reinforcing member embedded therein, an inner cylinder composed of a thin rubber like elastic cylindrical body and surrounded by said outer cylinder, said inner cylinder being bonded together with said outer cylinder at a plurality of regions each aligned with a generatrix whose motion generates the surface of said outer cylinder and at a region formed at each end of said inner cylinder to form a plurality of hollow chambers to be pressurized, and a core cylinder composed of a thick rubber like elastic body and surrounded by said plurality of hollow chambers, said inner core being embraced by said inner cylinder when compressed air is admitted into said plurality of hollow chambers and said inner cylinder is inwardly expanded.

2. A composite pneumatic marine fender according to claim 1 wherein said outer and inner cylinders are bonded together at three regions separated from each other and extended in a direction parallel to the axial line of said outer cylinder and terminate at both ends of said outer and inner cylinders to define three independent and separate hollow chambers to be pressurized.

3. A composite pneumatic marine fender according to claim 1 and further comprising a metal fitting extended through and secured to said bonded region and a chain connected at one end to said metal fitting and at another end to an anchor bolt fitted to the quay or dock wall.

4. A composite pneumatic marine fender comprising an outer cylinder composed of a thin rubber-like elastic cylindrical body including an inextensible reinforcing member embedded therein, an inner cylinder member composed of a thin rubber-like elastic cylindrical body and surrounded by said outer cylinder, said inner cylinder member being bonded together with said outer cylinder at a plurality of regions each aligned with a generatrix whose motion generates the surface of said outer cylinder and at a region formed at each end of said inner cylinder member to form a plurality of hollow chambers to be pressurized, and a core cylinder member composed of a thick rubber-like elastic body and surrounded by said plurality of hollow chambers, said core cylinder member being embraced by said inner cylinder when compressed air is admitted into said plurality of hollow chambers and said inner cylinder member is inwardly expanded, and a metal fitting extended through and secured to one of said members, and a chain connected at one end to said metal fitting and at another end to an anchor bolt fitted to the quay or dock wall.

* * * * *